US006671411B1

(12) United States Patent
Satoh (10) Patent No.: US 6,671,411 B1
(45) Date of Patent: Dec. 30, 2003

(54) IMAGE ENCODING APPARATUS, METHOD AND MEMORY MEDIUM THEREFOR (75) Inventor: Makoto Satoh, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 632 days.

(21) Appl. No.: 09/627,722

(22) Filed: Jul. 28, 2000

(30) Foreign Application Priority Data

Aug. 3, 1999 (JP) .......................................... 11-220495
Jul. 12, 2000 (JP) ....................................... 2000-211796

(51) Int. Cl.[7] ................................................ G06K 9/36
(52) U.S. Cl. ...................... 382/239; 382/246; 382/305; 341/67; 341/200
(58) Field of Search ................................ 382/239, 233, 382/232, 218, 246, 299, 300, 248, 172, 251, 305, 234; 341/94, 67, 200; 358/445, 451; 345/501; 700/11

(56) References Cited

U.S. PATENT DOCUMENTS

| 5,402,248 A | 3/1995 | Sato et al. ................... 358/426 |
| 5,812,146 A | 9/1998 | Sato et al. ................... 345/501 |
| 5,861,892 A | 1/1999 | Sato et al. ................... 345/435 |
| 6,272,248 B1 * | 8/2001 | Saitoh et al. ................ 382/218 |
| 6,285,458 B1 * | 9/2001 | Yada ......................... 358/1.15 |

* cited by examiner

Primary Examiner—Jayanti K. Patel
Assistant Examiner—Sheela Chawan
(74) Attorney, Agent, or Firm—Fitzpatrick, Cella, Harper & Scinto (57) ABSTRACT The invention provides an image encoding apparatus/method capable of inputting image data, quantizing the image data, variable length encoding the quantized image data, detecting the code length of the encoded image data, storing the encoded image data in a predetermined memory area of memory means, discriminating whether the detected code length exceeds the permissible memory range of the predetermined memory area, and, in case the permissible memory range is exceeded, terminating the storage operation in the memory area and continuing the encoding process and the detection process and setting the quantization parameter of the quantization process according to the result of detection of the detection process.

11 Claims, 4 Drawing Sheets

| 16 | 11 | 10 | 16 | 24 | 40 | 51 | 61 |
|---|---|---|---|---|---|---|---|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

QUANTIZATION COEFFICIENT TABLE FOR LUMINANCE

FIG. 3B

| 17 | 18 | 24 | 47 | 99 | 99 | 99 | 99 |
|---|---|---|---|---|---|---|---|
| 18 | 21 | 26 | 66 | 99 | 99 | 99 | 99 |
| 24 | 26 | 56 | 99 | 99 | 99 | 99 | 99 |
| 47 | 66 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |

QUANTIZATION COEFFICIENT TABLE FOR COLOR DIFFERENCE

FIG. 4

IMAGE ENCODING APPARATUS, METHOD AND MEMORY MEDIUM THEREFOR

BACKGROUND OF THE INVENTION

1. Field of the Invention

The present invention relates to an image encoding apparatus, a method and a memory medium therefor, for example an apparatus capable of generating image data and storing image data of plural images, as represented by a digital camera.

2. Related Background Art

Various digital cameras are already commercialized, and such camera is provided therein with a non-volatile semiconductor memory or a magnetic disk, as non-volatile memory means for recording and storing the image data of plural images.

The digital image data, generated by a solid-state image pickup device such as CCD provided in many digital camera, are extremely large in the data amount and are therefore usually recorded or stored in the above-mentioned non-volatile memory means after a compression encoding process is performed on the original image data to an extent that such compression is not clearly observable or does not cause distortion at the expanded restoration of the image.

As a representative method for compression encoding of the digital image data, there is known a compression encoding method including block division, orthogonal transformation and entropy encoding utilizing variable length codes.

In such representative compression encoding method, the original digital image data of an image are divided into plural rectangular blocks of a predetermined size, determining the two-dimensional orthogonal transformation coefficients for each block, then dividing and quantizing the orthogonal transformation coefficient, rearranged in a frequency coordinate system, with the quantization coefficients provided based on the human visual characteristics, and assigning predetermined variable length codes to the sequence of thus quantized orthogonal transformation coefficients, thereby generating the compression encoded image data as the final result.

However, the above-described compression encoding process requires an enormous number of operations. Thus, in case that such the compression encoding process is realized either by a program working on a general processor or by an exclusive hardware, there is generally employed temporary memory means capable of high-speed reading and writing operations such as a DRAM, in order to increase the processing speed.

In such temporary memory means, there are temporarily stored, in respectively assigned areas, the original image data entered from the image pickup device, the interim result of operations represented by the orthogonal transformation coefficients, and the compression encoded data obtained as a result of the compression encoding process.

After the completion of the above-described compression encoding process, the compression encoded data developed on the temporary memory means as the final result are transferred to and stored in the aforementioned non-volatile memory means for the purpose of final storage. Thus a serial photographing operation is completed and the system returns to a state capable of initiating the next photographing operation of an image.

In most digital cameras, the total capacity of the temporary memory means is naturally set at the minimum necessary value in consideration of the cost. For the original image data and for the interim result of operations, that always require area of fixed capacities, there are assigned areas having respectively fixed capacities in the temporary memory means.

On the other hand, for the compression encoded data having a variable length, there is assigned, in the temporary memory means, an area of a capacity corresponding to a data length assumed to be sufficient to a considerable extent.

However, the data length of the above-described compression encoded data of variable length varies significantly according to the frequency distribution and deviation of the original image data entered from the image pickup device, and it is already known that the size of the compression encoded data fluctuates by the statistical properties of the original image data even if the compression encoding process is executed with same parameters.

The digital camera utilizing such compression encoding process is generally provided with plural photographing modes (compression encoding modes). Such plural photographing modes include, for example, a photographing mode with a low compression rate, capable of recording high-quality image data with a low compression distortion though incapable of recording a large number of images, and a photographing mode with a relatively high compression rate, capable of recording a large number of images with image data of a relatively large compression distortion. The corresonding compression encoding process is executed for each mode.

In the aforementioned representative compression encoding method, a representative parameter capable of easily controlling the compression rate for given original image data is the value of the quantization coefficient. Since this value corresponds to the divisor of the division in the quantization process, the compression rate can be elevated or lowered by performing quantization respectively with a large or small quantization coefficient.

Usually, the operator of the digital camera selects one of the aforementioned plural photographing modes prior to the photographing operation. In such operation, the information necessitated by the operator includes the currently selected photographing mode and the number of pictures that can be taken and recorded with such photographing mode. Such information is usually determined uniquely by the available capacity of the non-volatile memory means, and the information display means such as an LCD equipped on the digital camera usually displays the kind of the photographing mode and the number of pictures that can be taken.

In the compression encoding process executed in the digital camera for the image data, it is essential to execute the compression encoding in such a manner that the data amount of the compression encoded image data does not exceed the upper limit value of a predetermined range. Such control achieved by data amount control means allows to secure the value displayed to the operator as the remaining number of pictures that can be taken.

At the same time it is also essential to execute the compression encoding in such a manner that the amount of the compression encoded image data does not become lower than the lower limit value of the predetermined range. Such control achieved by the data amount control means allows to prevent generation of the compression encoded data having an unnecessarily high compression rate and accordingly a large compression distortion.

In the conventional digital cameras, in order to obtain the compression encoded data of a desired data amount, there is employed a method of predicting the quantization coefficient capable of generating the desired data amount, based on the amount of the compression encoded data obtained by executing the compression encoding process on a part of the image data of an image, and executing the compression encoding process again with such new quantization coefficient, or a method of repeating the compression encoding process by varying the quantization coefficient each time, until the amount of the compression encode data becomes contained in the predetermined range, or a method of predicting an optimum quantization coefficient based on the statistical property (for example activity in each block) of the original image data, separately determined quantitatively.

The orthogonal transformation coefficient generated by orthogonal transformation is independent from the succeeding quantizing operation, and remains constant for given original image data. Consequently, for example in case of executing the compression encoding process plural times for the given original image data, the processing speed can be effectively increased by a method of storing the orthogonal transformation coefficient, generated at a first compression encoding process, in the temporary memory means, and, in the second and subsequent compression encoding processes, to employ thus stored orthogonal transformation coefficient, thereby dispensing with the operation relating to the orthogonal transformation.

However, in any of these methods, there may result an overflowing situation where the amount of the compression encoded data of variable length, obtained by the variable length encoding, exceeds the upper limit of the data amount estimated in advance and thus the compression encoded data consumes all the area assigned in the temporary memory means still in the course of the compression encoding process. Such overflow tends to occur particularly in the encoding process of the first time, since the compression encoding process is executed with a predetermined quantization coefficient.

When such situation is encountered, most digital cameras immediately terminate the currently executed compression encoding process and execute an exceptional process of repeating the compression encoding process by uniquely changing the quantization coefficient to a larger value. In the digital camera executing the compression encoding process by a program working on a general processor, the process time required for compression encoding of the original image data of an image is generally not negligibly small. It is therefore important to shorten such process time in order to improve the operability, but there is also required the exceptional process of interrupting the meaningless compression encoding process as explained above.

Also for avoiding the situation itself of such exceptional process, there is employed a method of assigning, in the temporary memory means, an area of a sufficiently large capacity corresponding to the theoretical upper limit of the compression encoded data, though such method is disadvantageous in cost.

If the compression encoding process is terminated immediately when the remaining capacity of the area assigned in the temporary memory means for the compression encoded data of variable length is consumed as explained in the foregoing, there remains unknown the total data amount of the compression encoded data, that should have been obtained with the parameter or the quantization coefficient selected for such terminated process.

Consequently the accuracy of prediction of the new quantization coefficient becomes naturally worse, and, in the repeated compression encoding process with thus determined quantization coefficient, there cannot be prevented danger of encountering an overflow situation where the area assigned in the temporary memory means is all consumed or an underflow situation of generating the compression encoded data of an unnecessarily small data amount.

Also in case the compression encoding process is immediately terminated as in the aforementioned conventional example, the storage of the orthogonal transformation coefficient into the temporary memory means is also interrupted incompletely, so that, in the repeated compression encoding process, the process has to be started from the orthogonal transformation operation requiring a large operation load.

SUMMARY OF THE INVENTION

In consideration of the foregoing, the object of the present invention is to provide an image encoding apparatus, a method therefor, and a memory medium storing an encoding program therefor, capable of obtaining an optimum parameter for repeating the compression encoding based on more accurate information even in case the amount of the encoded data exceeds the data memory capacity of memory means for storing such encoded data, thereby enabling the compression encoding within the data memory capacity while giving priority to the image quality.

The above-mentioned object can be attained, according to one aspect of the present invention, by providing an image encoding apparatus/method characterized by inputting image data, quantizing the image data, variable length encoding the quantized image data, detecting the code length of the encoded image data, storing the encoded image data in a predetermined memory area of memory means, discriminating whether the detected code length exceeds the memory capacity of the predetermined memory area, then, in case the memory capacity is exceeded, interrupting the memory operation into the memory area, while continuing the encoding process and the detecting process and setting the quantization parameter for the quantization process according to the result of detection of the detection process.

According to another aspect of the present invention, there is also provided a memory medium storing a code of a quantization step of quantizing image data, a code of an encoding step of variable length encoding the quantized image data, a code of a detection step of detecting the code length of the encoded image data, a code of a memory step of storing the encoded image data in a predetermined memory area of memory means, a code of a discrimination step of discriminating whether the detected code length exceeds the memory capacity of the predetermined memory area, and a code of a control step of in case the discrimination step identifies that the memory capacity is exceeded, interrupting the memory operation of the memory step while continuing the encoding step and the detection step and setting the quantization parameter in the quantization step according to the result of detection in the detection step.

Other objects, features and advantages of the present invention will become apparent from the following detailed description taken in conjunction with the accompanying drawings.

DETAILED DESCRIPTION OF THE PREFERRED EMBODIMENTS

In the following, the present invention will be clarified in detail by an embodiment thereof, with reference to the accompanying drawings.

Figure 1:
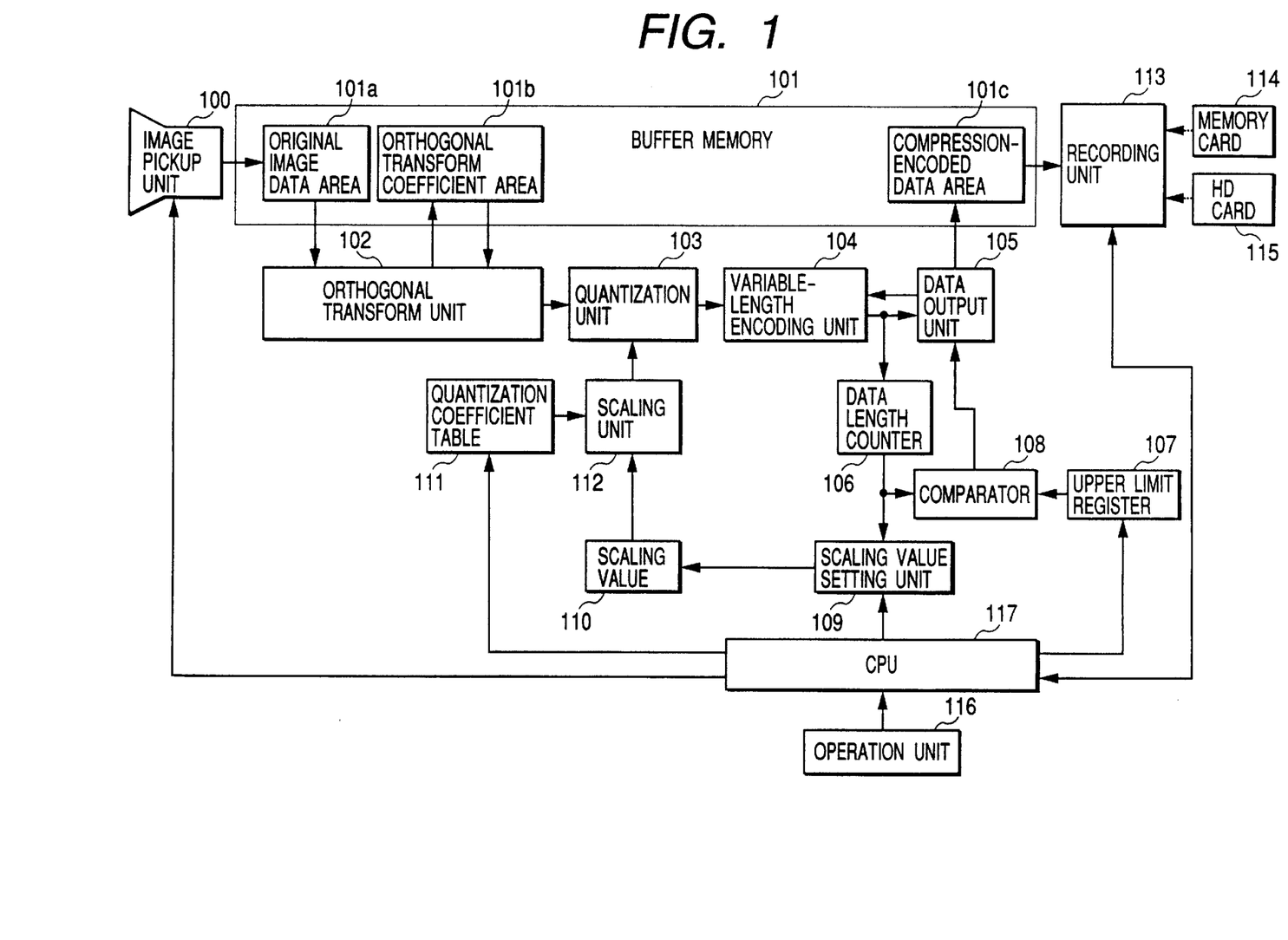
FIG. 1 is a block diagram showing the configuration of a digital camera employing the present invention.

FIG. 1 is a block diagram showing the configuration of a digital camera embodying the present invention.

Referring to FIG. 1, there are shown an image pickup unit 100 for picking up the image of an object and outputting image data; a buffer memory 101; an original image data area 101a for storing the original image data in the buffer memory 101; an orthogonal transformation coefficient area 101b for storing orthogonal transformation coefficient data in the buffer memory 101; and a compression encoded data area 101c for storing compression encoded data in the buffer memory 101. After the encoded data of an image are stored in the compression encoded data area 101c, the data are outputted to a memory unit 115 to be explained later, in response to a predetermined instruction.

There are also provided an orthogonal transformation unit 102, a quantization unit 103, a variable length encoding unit 104, a compression encoded data train output unit 105, a compression encoded data length counter 106, a storage area upper limit register 107, a comparator 108, a scaling value setting unit 109, a scaling value register 110, a quantization coefficient table 111, and a quantization coefficient scaling unit 112.

A recording unit 113 can be fitted with recording media of plural kinds. In the present embodiment, a memory card 114 and a hard disk (HD) 115 can be mounted. The recording unit 113 sends memory medium information, relating to the kind of the mounted recording medium and the remaining memory capacity thereof, to a CPU 117 to be explained later.

There are also provided an operation unit 116 including a power switch, a switch for selecting the photographing mode and the recording medium, a release switch for image recording etc.; and a CPU 117 for controlling the image pickup unit 100, upper limit register 107, scaling value setting unit 109, quantization coefficient table 111, recording unit 113 etc. based on the setting condition of the operation unit 116 and the memory medium information from the recording unit 113.

Figure 2:
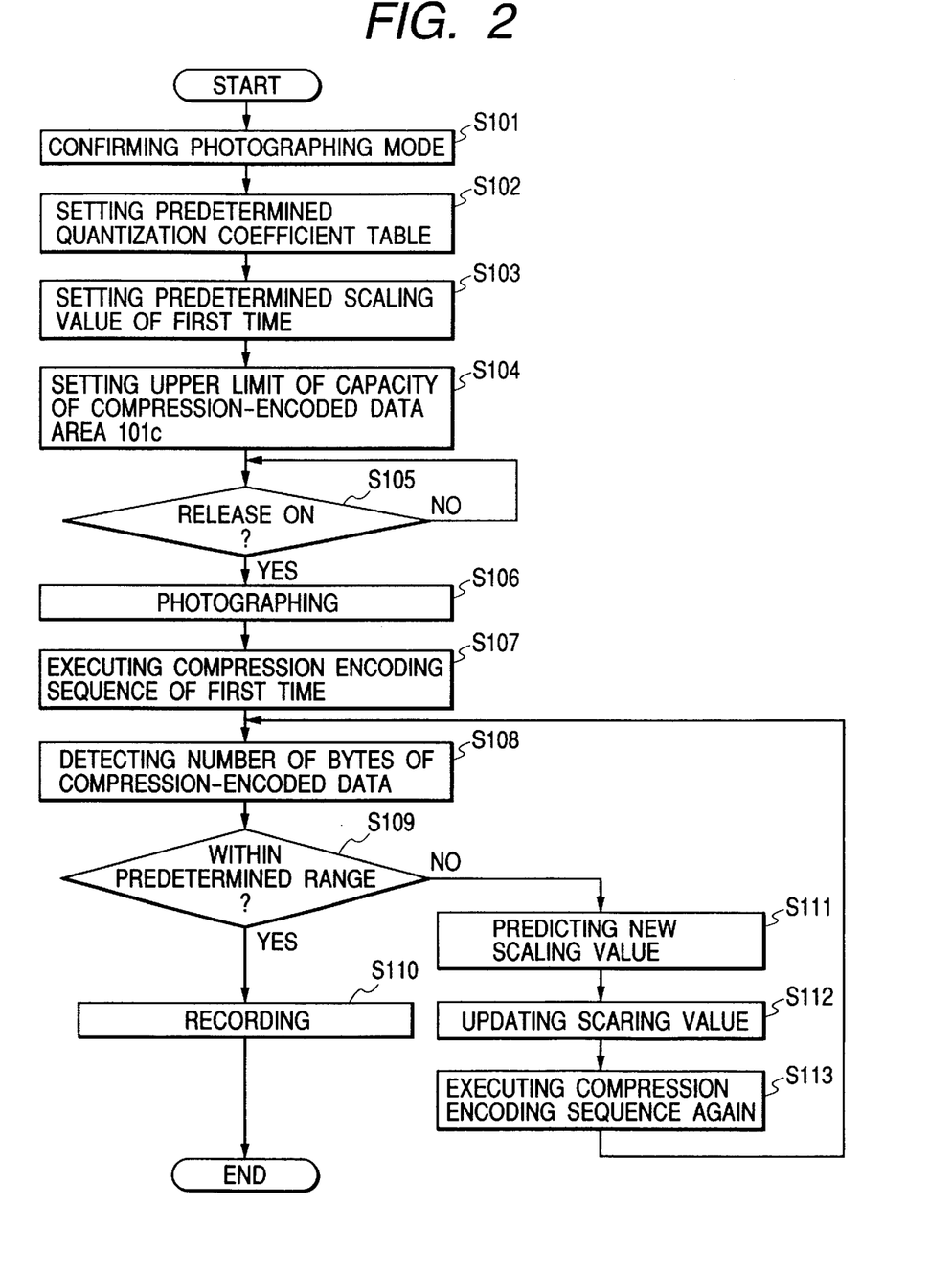
FIG. 2 is a flow chart showing the process sequence of the digital camera embodying the present invention.

In the following there will be explained the image recording operation of the digital camera of the above-described configuration, with reference to a flow chart shown in FIG. 2.

At first, the photographing mode selected in advance by the operator through the operation unit 116 is confirmed by the CPU 117 (step S102). In the present embodiment, the photographing mode can be a "high image quality mode" with a low compression rate, capable of recording high-quality image data with low compression distortion though incapable of recording a large number of images, or a "standard image quality mode" capable of recording a large number of images with a relatively large compression distortion.

Then the CPU 117 sets predetermined quantization coefficients in the quantization coefficient table 111 (step S102).

Figure 3A:
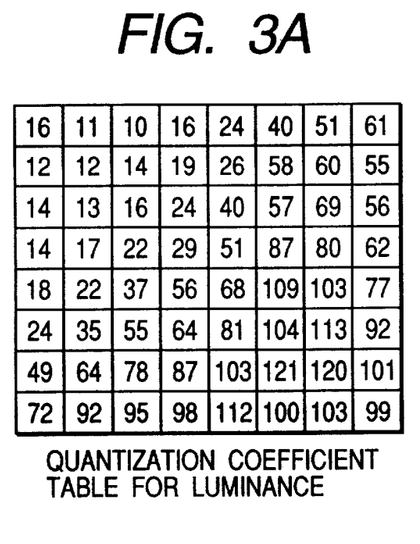
FIGS. 3A and 3B are views showing examples of the arrangement of quantization coefficients in a quantization coefficient table 111 of the present embodiment.
Figure 3B:
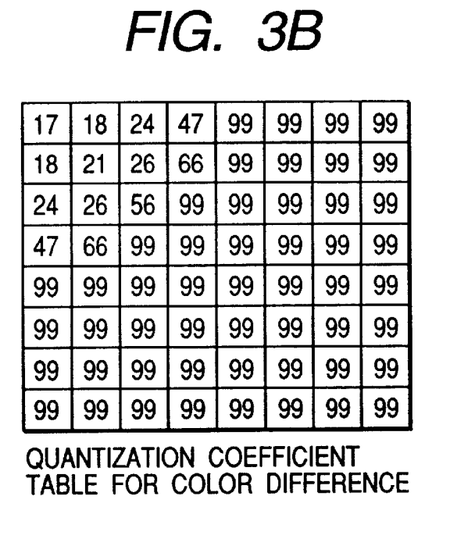

In the quantization coefficient table of the present embodiment, the quantization coefficients are arranged for example as shown in FIGS. 3A and 3B. The arrangement shown in FIG. 3A is used in case a block to be quantized represents the luminance component, and the arrangement shown in FIG. 3B is used in case such block represents the color difference component.

Each arrangement is composed of an 8×8 matrix of quantization coefficients, as shown in FIGS. 3A and 3B, in which the coefficients positioned at right correspond to the orthogonal transformation coefficients of a higher spatial frequency in the horizontal direction, and those positioned lower correspond to the orthogonal transformation coefficients of a higher spatial frequency in the vertical direction. Therefore, the quantization coefficient at the upper left-hand corner is used for quantization of the orthogonal transformation coefficient of the lowest spatial frequency component, namely DC component, within the block, while the quantization coefficient at the lower right-hand corner is used for quantization of the orthogonal transformation coefficient of the highest spatial frequency component within the block.

The quantization coefficients are generally made larger toward the lower right-hand corner as shown in FIGS. 3A and 3B, based on the human visual characteristics that the input characteristics for the higher spatial frequency component are lower than those for the lower spatial frequency component.

Then the CPU 117 controls the scaling value setting unit 109, thereby setting a predetermined first scaling value in the scaling value register 110 (step S103).

The first scaling value, thus set, corresponds to each of the photographing modes confirmed in the step S101.

More specifically, when the high image quality mode is selected, an initial scaling value corresponding thereto is set, but, when the standard image quality mode is selected, there is set a corresponding initial scaling value which is different from the initial scaling value for the high image quality mode.

Also the CPU 117 sets, in the storage area upper limit register 107, a byte number corresponding to the capacity of the compression encoded data area 101c in the buffer memory 101 (step S104).

Then there is discriminated whether the release switch provided in the operation unit 116 has been turned on (step S105). If the release switch has been turned on, the original digital image data of an image, subjected to necessary signal processing including gain control, gamma correction, white balance correction, CCD filter matrix correction and color space transformation in the image pickup unit 100 are stored in the original image data area 101a in the buffer memory 101 (step S106). The original image data area 101a provided in the buffer memory 101 has a capacity sufficient for storing the original image data of an image.

If the release switch has not been turned on, the current situation is maintained.

When the release switch is turned on, there is initiated a compression encoding sequence of first time (step S107).

At first the orthogonal transformation unit 102 executes a process of reading, from the original image data area 101a of the buffer memory 101, the original image data in succession in the unit of a rectangular block consisting of 8×8 pixels, then executing two dimensional orthogonal transformation represented by discrete cosine transformation and outputting in succession 64 orthogonal transformation coefficients re-arranged in the frequency coordinate system, and repeats such process until all the original image data of an image are processed.

The orthogonal transformation coefficients in the unit of a block, generated in the orthogonal transformation unit 103, are supplied in succession to the quantization unit 103 and also stored in succession in the orthogonal transformation coefficient area 101b in the buffer memory 101.

The orthogonal transformation coefficient area 101b has a capacity sufficient for storing all the orthogonal transformation coefficients corresponding to the original image data of one picture. The orthogonal transformation coefficients, thus stored, are utilized for the compression encoding sequence of the second time, to be explained later.

The quantization coefficient scaling unit 112 reads the scaling value, set in the scaling value register 110 in the step S103, as a multiplier and executes multiplication with each quantization coefficient, read from the quantization coefficient table 111, as the multiplicated. Then the fractional portion of the obtained product is rounded to a closest integer, and thus obtained integer is given in succession to the quantization unit 103 as the scaled quantization coefficient.

In the present embodiment, the scaling value to be set in the scaling value register 110 or to be used in the quantization coefficient scaling unit 112 can be varied in 50 steps from 1/50 to 50/50. A smaller scaling value more reduces the quantization coefficient read from the quantization coefficient table 111 by the scaling process.

In case the scaling value is selected at the largest possible value 50/50, the scaling process becomes equivalent to the multiplication by unity, whereby the quantization coefficient read from the quantization coefficient table 111 is supplied, without change, to the quantization unit 103.

In case a particularly small scaling value is selected and the integer obtained by rounding the fractional portion to the closest integer becomes 0, the quantization coefficient scaling unit 112 executes an exceptional process of outputting 1 as the scaled quantization coefficient. This is to avoid a dividing operation by 0 in the succeeding quantization unit 103.

The quantization unit 103 executes a process of successively quantizing the orthogonal transformation coefficients in the unit of a block, input in succession from the orthogonal transformation unit 101, with the scaled quantization coefficients input in succession from the quantization coefficient scaling unit 112 and outputting the 64 quantized orthogonal transformation coefficients in succession to the variable length encoding unit 104, and repeats such process until all the original image data of an image are processed.

The quantization process executed in the quantization unit 103 consists of a dividing operation of the input orthogonal transformation coefficient as a dividend by the input scaled quantization coefficient as a divisor, rounding the fractional portion of the obtained quotient to a closest integer and sending thus obtained integer as the quantized orthognal transformation coefficient to the variable length encoding unit 104.

The variable length encoding unit 104 executes an operation of conducting an encoding process of assigning predetermined variable length codes to the 64 quantized orthogonal transformation coefficients input in succession from the quantization unit 103 and outputting a train of the compression encoded data, and repeats such operation unit all the original image data of an image is processed.

The compression encoded data train, generated by the variable length encoding unit 104 is input into the compression encoded data train output unit 105, which continuous outputs the compression encoded data for successive storage in the compression encoded data train storage area 101c in the buffer memory 101. However, in case storage in all the storage area 101c is informed from the comparator 108 as will be explained later, the data output unit 105 immediately terminates the output operation of the compression encoded data to the data storage area 101c, thereby preventing storage beyond such storage area 101c. Nevertheless, in order to cause the variable length encoding unit 104 to continue the encoding process, the data output unit 105 continues to output a status signal indicating that data can be received, to the variable length encoding unit 104.

Also the data length of the compression encoded data train generated by the variable length encoding unit 104 is measured, for example in the unit of 8 bits, in cumulative manner by the compression encoded data length counter 106, and, at the completion of compression encoding process for the image data of an image, the compression encoded data length counter 106 stores the total number of bytes of the compression encoded data train generated with the first scaling value set in the scaling value register 110 in the step S103.

The number of bytes counted in cumulative manner by the compression encoded data length counter 106 is input into the comparator 108, and is compared in succession with a number of bytes read from the storage area upper limit register 107, which number corresponds to the capacity of the compression encoded data area 101c of the buffer memory 101.

When the number of bytes measured in cumulative manner by the compression encoded data length counter 106 reaches the number of bytes corresponding to the capacity of the storage area 101c, the comparator 108 informs the aforementioned compression encoded data train output unit 105 of occurrence of such situation. In response to such notice, the compression encoded data train output unit 105 immediately terminates the current output operation of the compression encoded data.

However, even after the number of bytes measured in cumulative manner by the compression encoded data length counter 106 reaches the number of bytes corresponding to the capacity of the storage area 101c, there is still repeatedly executed, as explained in the foregoing, the serial process including the generation of the orthogonal transformation coefficients and the storage thereof into the area 101b by the orthogonal transformation unit 102, the quantization process of the orthogonal transformation coefficients by the quantization unit 103, the generation of the compression encoded data by the variable length encoding unit 104 and the counting process for the data length of the compression encoded data train by the compression encoded data length counter 106, until all the image data of an image area processed.

The aforementioned compression encoding sequence of the first time is terminated when the variable length encoding unit 104 completes the variable length encoding process for all the original image data of one picture (step S107).

Then the scaling value setting unit 109, controlled by the CPU 117, reads the content of the compression encoded data length counter 106, namely the number of bytes of the compression encoded data train (step S108).

Then there is discriminated whether the number of bytes of the compression encoded data train is within a predetermined permissible range (step S109).

If the step S109 identifies that the number of bytes is within the permissible range, there is terminated the serial compression encoding process relating to the photographing operation, and the recording unit 113 executes an error correction encoding process etc. corresponding to the recording medium selected by the operation unit 116 and records the compression encoded data in the recording medium (step S110).

On the other hand, if the step S109 identifies that the number of bytes is outside the permissible range in the respective photographing mode, there is predicted a new scaling value in preparation for starting the compression encoding sequence of a second time to be explained in the following (step S111).

Figure 4:
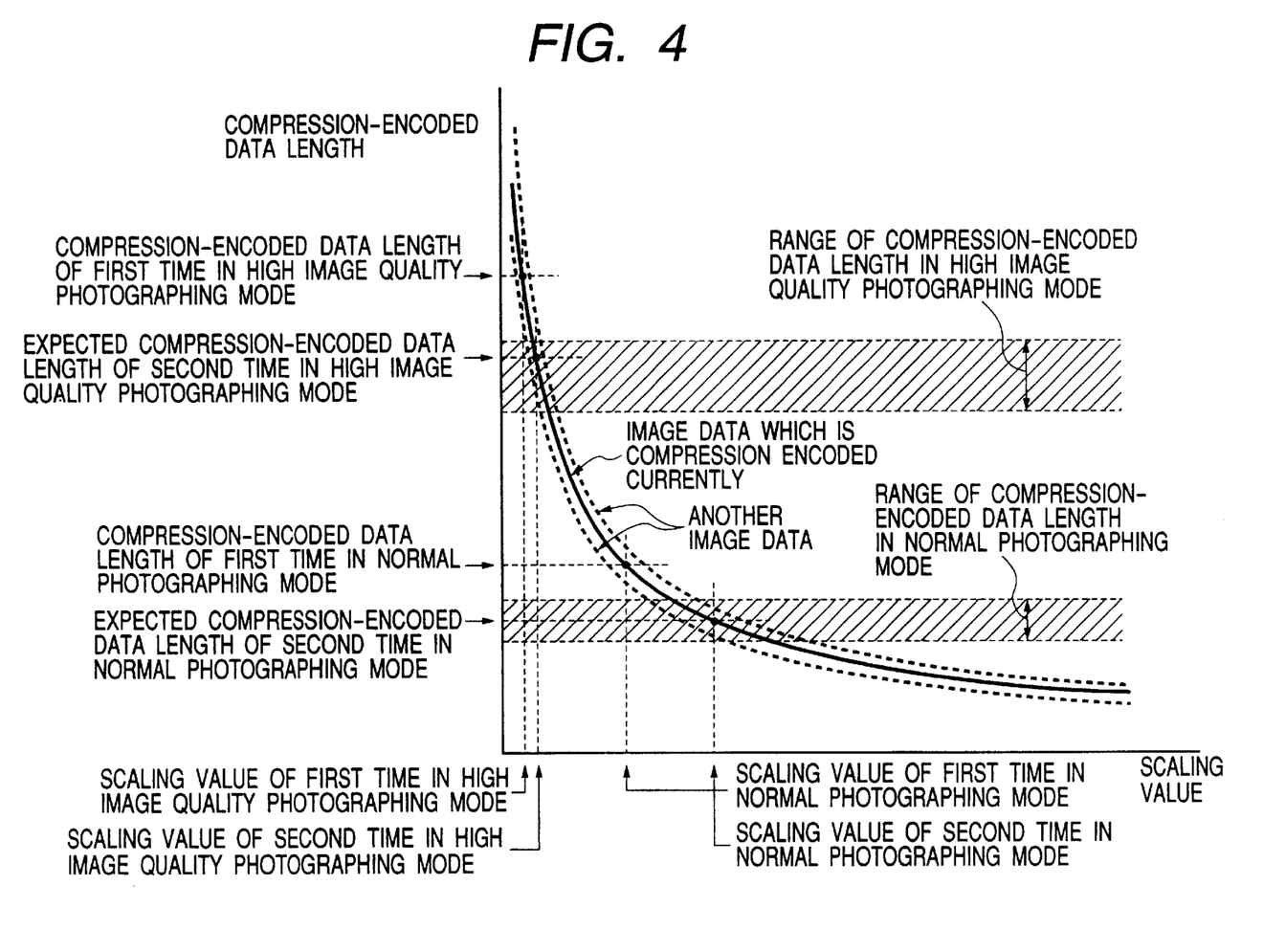
FIG. 4 is a chart showing the relationship between a scaling value and data length of the compression encoded data.

FIG. 4 shows the relationship between the scaling value and the data length (data amount) of the compression encoded data train in the present embodiment. In the illustrated chart, the compression encoded data length increases toward the upper side of the ordinate, and the scaling value increases toward the right-hand side of the abscissa.

In FIG. 4, a solid-lined curve shows the relationship between the amount of the compression encoded data and the scaling value for the original image data based on the current compression encoding process, and the broken-lined curves positioned above and below the solid-lined curve correspond to the compression encoded data for other original image data.

As will be apparent from FIG. 4, the curve shifts vertically depending on the statistical properties of the image data, such as the distribution and deviation in the spatial frequency, but the properties such as the shape of curve and such as a monotonously decreasing function remain unchanged. The present embodiment utilizes such properties in calculating the scaling value for obtaining the optimum compression encoded data train.

The above-mentioned observation indicates that the curve, representing the relationship between the scaling value and the corresponding length of the compression encoded data train, can be approximated by a function, and that, stated inversely, a scaling value generating a compression encoded data of a desired number of bytes can be predicted with a certain accuracy.

In the present embodiment, a point on the curve is obtained from the scaling value of the first time set in the step S103 and the number of bytes of the corresponding compression encoded data train, read in the step S108. The apparatus stores in advance a basic approximating equation, and an approximating equation passing through the above-mentioned point is determined from such basic approximating equation. Then, from such approximating equation, there is calculated a new scaling value capable of generating a compression encoded data train falling within the predetermined range corresponding to the selected photographing mode (step S111). The new scaling value is so selected that the length of the compression encoded data train becomes closest to the upper limit value of the aforementioned predetermined permissible range.

Also instead of generating the approximating equation as explained above, there may be employed a method of preparing in advance the data of plural curves as look-up tables, then selecting a look-up table closest to the relationship between the scaling value of the first time and the number of bytes, and extracting a scaling value falling within the predetermined permissible range corresponding to the selected photographing mode, based on thus selected table.

Then the scaling value setting unit 109, controlled by the CPU 117, sets the new scaling value calculated in the step S111 in the scaling value register 110 (step S112).

When the new scaling value is set in the scaling value register 110, there is initiated the compression encoding sequence of a second time (step S113).

The quantization coefficient scaling unit 112 reads the new scaling value, set in the scaling value register 110 in the step S112, and provides the quantization unit 103 with the values calculated by a scaling process, similar to that in the first compression encoding sequence, in succession as the new scaled quantization coefficients.

The quantization unit 103 executes a process of reading in succession the orthogonal transformation coefficients, already calculated in the unit of a block, from the area 101b of the buffer memory 101, successively executing a similar quantization process utilizing the new scaled quantization coefficients input in succession from the quantization coefficient scaling unit 112, and outputting in succession the 64 new quantized orthogonal transformation coefficients to the variable length encoding unit 104, and repeats such process until all the original image data of an image are processed.

The variable length encoding unit 104 executes an operation of conducting in succession a similar encoding process of assigning predetermined variable length codes to the 64 new quantized orthogonal transformation coefficients input in succession from the quantization unit 103 and outputting the new compression encoded data train, and repeats such operation until all the original image data of an image are processed.

The new compression encoded data train, generated by the variable length encoding unit 104, is input into the compression encoded data train output unit 105, which executes a similar output operation of the compression encoded data for storage in succession in the compression encoded data train area 101c of the buffer memory 101.

Also the data length of the compression encoded data train generated by the variable length encoding unit 104 is measured, in the unit of 8 bits, in cumulative manner by the compression encoded data length counter 106, and, at the completion of compression encoding process for the image data of an image, the compression encoded data length counter 106 stores the total number of bytes of the compression encoded data train generated with the second scaling value set in the scaling value register 110 in the step S112.

The aforementioned compression encoding sequence of the second time is terminated when the variable length encoding unit 104 completes the variable length encoding process for all the original image data of an image (step S113). Thereafter the sequence returns to the step S108.

Thus the compression encoded data, stored in the area 101c of the buffer memory 101 and having a number of bytes falling within the predetermined permissible range, are recorded as a compression encoded image data file in the memory medium (memory card 114 or HD 115) by the recording unit 113.

In the foregoing embodiment, the compression encoding with the scaling value of first time set in the step S103 is executed in the compression encoding sequence of the first time to determine a point on the curve indicating the relationship between the scaling value and the corresponding length of the compression encoded data as shown in FIG. 4, and such curve is approximated by a function having a single coefficient, but the foregoing embodiment can be easily expanded to a configuration utilizing two scaling values, in order to achieve more accurate approximation by a function with two coefficients.

Also even in case there exist plural photographing modes (compression encoding modes), or plural permissible ranges for the compression encoded data, the compression encoded data can be accommodated within the permissible range corresponding to each photographing mode by selecting the scaling value of the first time, in the step S103, which corresponds to such photographing mode.

The foregoing embodiment has been explained as an example of the application to a digital camera, but the present invention is not limited to such application and is likewise applicable to a case of forming a permissible range in storing the image data with compression encoding in a memory medium.

The present invention may be applied to a system consisting of plural equipment (for example host computer, interface devices, reader, printer etc.) or an apparatus consisting of a single equipment as explained in the foregoing.

Also the object of the present invention can be naturally attained in a case where a memory medium storing the program codes of a software realizing the functions of the aforementioned embodiments is supplied to a system or an apparatus and a computer (CPU or MPU) of the above-mentioned system or apparatus reads and executes the program codes stored in such memory medium. In such case the program codes themselves read from the memory medium realize the functions of the aforementioned embodiments, and the memory medium storing the program codes constitutes the present invention. The present invention includes not only a case where the functions of the aforementioned embodiments are realized by the execution of the read program codes by the computer but also a case where an operating system or the like functioning on the computer executes all or a part of the actual processes under the control of such program codes thereby realizing the functions of the aforementioned embodiments.

The present invention further includes a case wherein the program codes read from the memory medium are once stored in a memory provided in a function expansion board inserted into the computer or a function expansion unit connected to the computer, and a CPU provided in the function expansion board or the function expansion unit executes all the process or a part thereof according to the instructions of such program codes, thereby realizing the functions of the aforementioned embodiments.

As explained in the foregoing, even in case the data length of the compression encoded data generated by the compression encoding process exceeds the capacity of a specified area of the temporary memory means, there can be known the data length of the compression encoded data that should have been stored, so that it is rendered possible to substantially exactly predict the new scaling value capable of generating the compression encoded image data falling within the predetermined permissible range. As a result it is rendered possible to always indicate, to the operator, the memory management of the compression encoded image data on the non-volatile memory and the exact number of the images that can be photographed.

Also, even in case the data length of the compression encoded data generated by the compression encoding process exceeds the capacity of a specified area of the temporary memory means, the storage of the orthogonal transformation coefficients into the temporary memory means is completed for the original image data of an image, so that, in the second sequence, the orthogonal transformation operation requiring a relatively long time can be dispensed with and the orthogonal transformation coefficients stored in the temporary memory means can be re-used thereby reducing the entire process time of compression encoding throughout the first and second sequences.

As explained in the foregoing, the embodiments allow to obtain optimum parameters for compression encoding based on more accurate information even in case the code length of the image data exceeds the permissible range, thereby achieving the compression encoding with priority given to the image quality, while maintaining the code length within the permissible range.

The foregoing description of the embodiments has been given for illustrative purposes only and not to be constructed as imposing any limitation in every respect.

The scope of the invention is, therefore, to be determined solely by the following claims and not limited by the text of the specifications and alterations made within a scope equivalent to the scope of the claims fall with the true spirit and scope of the invention.

What is claimed is:

1. An image encoding apparatus comprising:
    a) input means for inputting image data;
    b) quantization means for quantizing the image data;
    c) encoding means for variable length encoding the image data quantized by said quantization means;
    d) detection means for detecting the code length of the image data encoded by said encoding means;
    e) memory means for storing, in a predetermined memory area, the image data encoded by said encoding means;
    f) discrimination means for discriminating whether the code length detected by said detection means exceeds the permissible memory range of the predetermined memory area; and
    g) control means adapted, in case said discrimination means identifies that the permissible memory range is exceeded, to terminate the storage operation of said memory means and to continue with the encoding process of said encoding means and the detecting process of said detection means and to set the quantization parameter of said quantization means according to the output of said detection means.

2. An apparatus according to claim 1, wherein said control means has a table indicating the relationship between the quantization parameter and the code length and is adapted to set a quantization parameter which causes the code length to fall within the permissible memory range by referring to the table.

3. An apparatus according to claim 1, wherein said input means includes orthogonal transformation means for executing orthogonal transformation of the image data.

4. An apparatus according to claim 1, wherein said memory means is adapted to store the image data input by said input means.

5. An apparatus according to claim 1, wherein said memory means is adapted to store the image data supplied to said quantization means.

6. An apparatus according to claim 1, wherein said input means includes image pickup means for picking up the image of an object and outputting the image data.

7. An apparatus according to claim 1, further comprising recording means for recording, on a recording medium, encoded image data stored in said memory means.

8. An apparatus according to claim 7, wherein said recording means is adapted to record the encoded image data on the recording media of plural kinds.

9. An apparatus according to claim 1, further comprising image quality mode setting means for setting an image quality mode of a photographed image, and permissible memory range setting means for setting a permissible memory range according to the output of said image quality mode setting means.

10. An image encoding method comprising the steps of:
a) inputting image data;
b) quantizing the image data;
c) variable length encoding the quantized image data;
d) detecting the code length of the encoded image data;
e) storing the encoded image data in a predetermined memory area of memory means;
f) discriminating whether the detected code length exceeds the permissible memory range of the predetermined memory area; and
g) in case the permissible memory range is exceeded, terminating the storage operation in the memory area and continuing said encoding process and said detection process and setting the quantization parameter of said quantization process according to the result of detection of said detection process.

11. A memory medium storing program codes of an image encoding process, comprising:

a) a code of a quantization step, of quantizing image data;
b) a code of an encoding step, of variable length encoding the quantized image data;
c) a code of a detection step, of detecting the code length of the encoded image data;
d) a code of a memory step, of storing the encoded image data in a predetermined memory area of memory means;
e) a code of a discrimination step, of discriminating whether the detected code length exceeds a permissible memory range of the predetermined memory area; and
f) a code of a control step, adapted, in case said discrimination step identifies that the permissible memory range is exceeded, to terminate the memory operation of said memory step, while continuing the process of said encoding step and said detecting step, and set a quantization parameter in said quantization step according to a result of detection in said detection step.

* * * * *

UNITED STATES PATENT AND TRADEMARK OFFICE
CERTIFICATE OF CORRECTION

PATENT NO. : 6,671,411 B1
APPLICATION NO. : 09/627722
DATED : December 30, 2003
INVENTOR(S) : Makoto Satoh It is certified that error appears in the above-identified patent and that said Letters Patent is hereby corrected as shown below:

SHEET 2: "SCARING" should read --SCALING--.

COLUMN 1:
    Line 9, "example" should read --example,--.
    Line 21, "camera" should read --cameras,--.
    Line 61, "Thus" should read --Thus,--.

COLUMN 2:
    Line 2, "operations," should read --operations--.

COLUMN 3:
    Line 8, "encode" should read --encoded--.
    Line 17, "example" should read --example,--.

COLUMN 5:
    Line 45, "recording etc.;" should read --recording, etc.,--.
    Line 48, "unit 13 etc." should read --unit 13, etc.,--.

COLUMN 6:
    Line 51, "unit 100" should read --unit 100,--.

COLUMN 7:
    Line 26, "more" should read --further--.
    Line 55, "orthognal" should read --orthogonal--.
    Line 63, "unit" should read --until--.

COLUMN 8:
    Line 1, "continuous" should read --continuously--.
    Line 13, "Also" should read --Also,--.
    Line 15, "example" should read --example,--.
    Line 53, "processed" should read --is processed--.
    Line 58, "Then" should read --Then,--.
    Line 62, "Then" should read --Then,--.

UNITED STATES PATENT AND TRADEMARK OFFICE
CERTIFICATE OF CORRECTION

PATENT NO.          : 6,671,411 B1
APPLICATION NO. : 09/627722
DATED                  : December 30, 2003
INVENTOR(S)         : Makoto Satoh It is certified that error appears in the above-identified patent and that said Letters Patent is hereby corrected as shown below:

<u>COLUMN 9</u>:
        Line 3, "process etc." should read --process, etc.,--.
        Line 44, "stores in advance" should read --stores, in advance,--.

Signed and Sealed this

Twenty-sixth Day of August, 2008

JON W. DUDAS
*Director of the United States Patent and Trademark Office*